(12) United States Patent
Hong et al.

(10) Patent No.: US 12,739,395 B2
(45) Date of Patent: Sep. 15, 2026

(54) MOTION-COMPENSATED ATTRIBUTE CODING USING GEOMETRY AND ATTRIBUTE INFORMATION IN GEOMETRY-BASED DYNAMIC POINT CLOUD CODING

(71) Applicants: SONY GROUP CORPORATION, Tokyo (JP); Sony Corporation of America, New York, NY (US)

(72) Inventors: Haoran Hong, Los Angeles, CA (US); Alexandre Zaghetto, San Jose, CA (US); Danillo Graziosi, Flagstaff, AZ (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 33 days.

(21) Appl. No.: 18/758,157

(22) Filed: Jun. 28, 2024

(65) Prior Publication Data

US 2026/0006211 A1 Jan. 1, 2026

(51) Int. Cl.

| | |
|---|---|
| ***H04N 7/12*** | (2006.01) |
| ***H04N 19/139*** | (2014.01) |
| ***H04N 19/172*** | (2014.01) |
| ***H04N 19/513*** | (2014.01) |
| ***H04N 19/82*** | (2014.01) |

(52) U.S. Cl.

CPC ......... *H04N 19/139* (2014.11); *H04N 19/172* (2014.11); *H04N 19/513* (2014.11); *H04N 19/82* (2014.11)

(58) Field of Classification Search

CPC .. H04N 19/139; H04N 19/172; H04N 19/513; H04N 19/82

See application file for complete search history.

(56) References Cited

U.S. PATENT DOCUMENTS

| | | | | |
|---|---|---|---|---|
| 12,256,096 | B2 * | 3/2025 | Pham Van | G06T 9/001 |
| 2021/0217203 | A1 * | 7/2021 | Kim | G06T 9/001 |
| 2022/0189119 | A1 * | 6/2022 | Seo | G06T 7/00 |
| 2024/0179347 | A1 * | 5/2024 | Lee | H04N 19/57 |

(Continued)

*Primary Examiner* — Gims S Philippe

(74) *Attorney, Agent, or Firm* — Haverstock & Owens, A Law Corporation

(57) ABSTRACT

An attribute inter-prediction framework using motion search criterion, proper reference, attribute projection and in-loop filter is described herein. An alternative motion estimation strategy incorporates color distance into the motion search criterion where geometry and attribute motion are jointly searched which leads to a single motion vector associated with each predicted block. The composed distance is the weighted sum of color and geometry distance. With the composed distance, two new types of search criterion are used to estimate the motion vectors: using the nearest neighbor composed distance, using the minimum composed distance based on the search of composed distances associated with each reference point within the search window. A dedicated attribute coding scheme using a two-pass motion search scheme, where the first pass is based on geometry only, and the second pass targets on eliminating temporal attribute redundancy. An in-loop filter can be applied to the projected attributes.

18 Claims, 8 Drawing Sheets

(56) References Cited

U.S. PATENT DOCUMENTS

| | | | | |
|---|---|---|---|---|
| 2024/0259568 | A1* | 8/2024 | Xu | H04N 19/52 |
| 2024/0397093 | A1* | 11/2024 | Lee | H04N 19/597 |
| 2025/0133233 | A1* | 4/2025 | Oh | G06T 9/00 |

* cited by examiner

MOTION-COMPENSATED ATTRIBUTE CODING USING GEOMETRY AND ATTRIBUTE INFORMATION IN GEOMETRY-BASED DYNAMIC POINT CLOUD CODING

FIELD OF THE INVENTION

The present invention relates to three dimensional graphics. More specifically, the present invention relates to coding of three dimensional graphics.

BACKGROUND OF THE INVENTION

Point cloud compression is an important technology for handling large sets of 3D data points, which are used in various applications such as virtual reality (VR), augmented reality (AR), telecommunications, autonomous vehicles, and digital preservation of world heritage. The goal is to efficiently compress the vast amount of data in point clouds without significantly losing detail or accuracy.

The Moving Picture Experts Group (MPEG) has developed two main standards for point cloud compression: Geometry-based Point Cloud Compression (G-PCC) and Video-based Point Cloud Compression (V-PCC).

V-PCC leverages existing video compression technologies by projecting 3D point clouds onto 2D planes and encoding these projections as video streams. This approach is particularly advantageous for dynamic point clouds, such as those in real-time communication or interactive VR/AR environments.

G-PCC focuses on directly compressing the 3D geometric data of point clouds. G-PCC is particularly effective for static point clouds, such as those used in cultural heritage preservation, or sparse point clouds used for autonomous navigation.

G-PCC encodes point cloud data directly in 3D space, contrasting with the V-PCC that uses 3D to 2D projections. The method is highly effective for compressing sparse point clouds that do not translate well into 2D projections.

Currently, G-PCC standard primarily supports intra prediction, meaning it does not utilize temporal prediction tools that could improve compression efficiency for dynamic point clouds.

More recently, MPEG's activity towards a possible 2nd edition of G-PCC is extending it to dynamic point clouds with additional tools for inter-frame geometry and attribute coding.

SUMMARY OF THE INVENTION

An attribute inter-prediction framework using motion search criterion, proper reference, attribute projection and in-loop filter is described herein. An alternative motion estimation strategy incorporates color distance into the motion search criterion where geometry and attribute motion are jointly searched which leads to a single motion vector associated with each predicted block. The composed distance is the weighted sum of color and geometry distance. With the composed distance, two new types of search criterion are used to estimate the motion vectors: using the nearest neighbor composed distance, using the minimum composed distance based on the search of composed distances associated with each reference point within the search window. A dedicated attribute coding scheme using a two-pass motion search scheme, where the first pass is based on geometry only, and the second pass targets on eliminating temporal attribute redundancy. An in-loop filter can be applied to the projected attributes.

In one aspect, a method programmed in a non-transitory memory of a device comprises performing joint motion estimation based on a previous frame and a current frame of content to generate geometry motion vectors and generating a new frame based on the geometry motion vectors using inter-frame attribute coding. The method further comprises performing geometry motion compensation with attribute information based on the geometry motion vectors to generate a motion compensated frame, performing inter-frame geometry coding to generate a reconstructed geometry, implementing color projection to project the attributes of the current frame onto the reconstructed geometry. The method further comprises implementing additional color projection. The joint motion estimation is based on geometry information and attribute information. The geometry information comprises a geometry distance, the attribute information comprises a color distance, and the geometry distance and color distance are combined to generate a composed distance which is used for the joint motion estimation.

In another aspect, a method programmed in a non-transitory memory of a device comprises performing geometry-based motion estimation based on a previous frame and a current frame of content to generate geometry motion vectors, performing joint motion estimation based on the previous frame and a generated point cloud based on inter-frame geometry coding and color projection to generate color motion vectors, performing motion compensation with attributes to generate a motion compensated frame and generating a new frame based on the motion compensated frame using inter-frame attribute coding. The method further comprises implementing additional color projection. The joint motion estimation is based on geometry information and attribute information. The geometry information comprises a geometry distance, the attribute information comprises a color distance, and the geometry distance and color distance are combined to generate a composed distance which is used for the joint motion estimation. The method further comprises implementing an in-loop filter to filter color in a projected frame.

In another aspect, an apparatus comprises a non-transitory memory for storing an application, the application for: performing joint motion estimation based on a previous frame and a current frame of content to generate geometry motion vectors and generating a new frame based on the geometry motion vectors using inter-frame attribute coding and a processor coupled to the memory, the processor configured for processing the application. The application is further configured for performing geometry motion compensation with attribute information based on the geometry motion vectors to generate a motion compensated frame, performing inter-frame geometry coding to generate a reconstructed geometry, implementing color projection to project the attributes of the current frame onto the reconstructed geometry. The application is further configured for implementing additional color projection. The joint motion estimation is based on geometry information and attribute information. The geometry information comprises a geometry distance, the attribute information comprises a color distance, and the geometry distance and color distance are combined to generate a composed distance which is used for the joint motion estimation.

In another aspect an apparatus comprises a non-transitory memory for storing an application, the application for: performing geometry-based motion estimation based on a previous frame and a current frame of content to generate geometry motion vectors, performing joint motion estimation based on the previous frame and a generated point cloud based on inter-frame geometry coding and color projection to generate color motion vectors, performing motion compensation with attributes to generate a motion compensated frame and generating a new frame based on the motion compensated frame using inter-frame attribute coding and a processor coupled to the memory, the processor configured for processing the application. The application is further configured for implementing additional color projection. The joint motion estimation is based on geometry information and attribute information. The geometry information comprises a geometry distance, the attribute information comprises a color distance, and the geometry distance and color distance are combined to generate a composed distance which is used for the joint motion estimation. The application is further configured for implementing an in-loop filter to filter color in a projected frame.

In another aspect, a system comprises an encoder configured for encoding content and a decoder configured for: performing joint motion estimation based on a previous frame and a current frame of content to generate geometry motion vectors and generating a new frame based on the geometry motion vectors using inter-frame attribute coding. The decoder is further configured for performing geometry motion compensation with attribute information based on the geometry motion vectors to generate a motion compensated frame, performing inter-frame geometry coding to generate a reconstructed geometry, and implementing color projection to project the attributes of the current frame onto the reconstructed geometry. The decoder is further configured for implementing additional color projection. The joint motion estimation is based on geometry information and attribute information. The geometry information comprises a geometry distance, the attribute information comprises a color distance, and the geometry distance and color distance are combined to generate a composed distance which is used for the joint motion estimation.

In another aspect, a system comprises an encoder configured for encoding content and a decoder configured for: performing geometry-based motion estimation based on a previous frame and a current frame of content to generate geometry motion vectors, performing joint motion estimation based on the previous frame and a generated point cloud based on inter-frame geometry coding and color projection to generate color motion vectors, performing motion compensation with attributes to generate a motion compensated frame and generating a new frame based on the motion compensated frame using inter-frame attribute coding. The decoder is further configured for implementing additional color projection. The joint motion estimation is based on geometry information and attribute information. The geometry information comprises a geometry distance, the attribute information comprises a color distance, and the geometry distance and color distance are combined to generate a composed distance which is used for the joint motion estimation. The decoder is further configured for implementing an in-loop filter to filter color in a projected frame.

DETAILED DESCRIPTION OF THE PREFERRED EMBODIMENT

Figure 1:
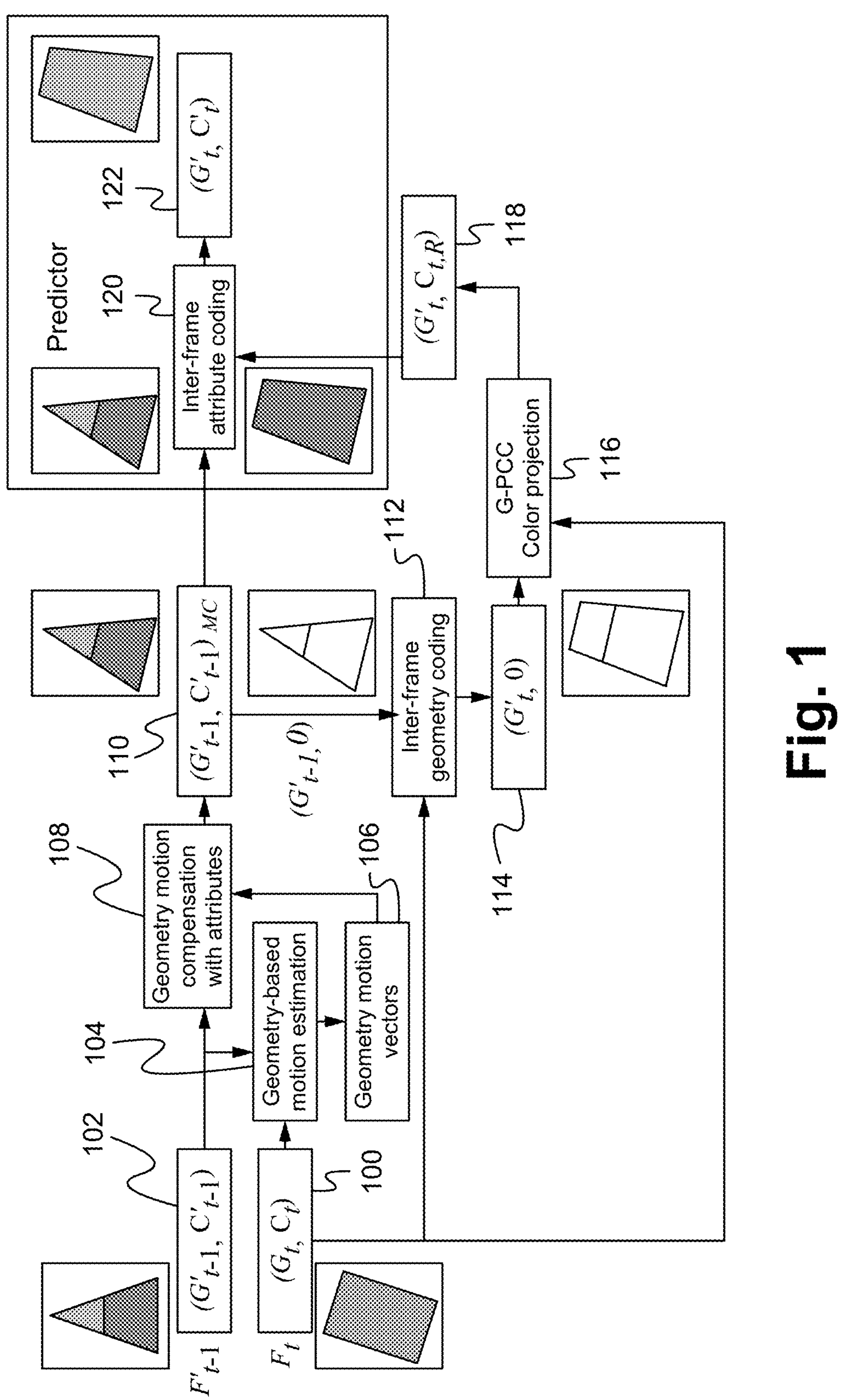
FIG. 1 illustrates a diagram of a motion estimation implementation according to some embodiments.

Geometry-based Point Cloud Compression (G-PCC) is one of the standard compression methods developed by the Moving Picture Experts Group (MPEG) for compressing three-dimensional point cloud data. Point clouds represent objects and scenes in three-dimensional space using a collection of points, each with its position (geometry) and potentially with associated attributes such as color. G-PCC primarily focuses on the compression of static objects and scenes, as well as dynamically acquired point clouds used in automotive applications. Following the release of the first edition of G-PCC, a comprehensive exploration into expanding its capabilities to encompass dynamic objects was initiated. A significant improvement within the extension of G-PCC includes advancements in Trisoup and octree dynamic geometry coding.

In terms of attribute coding, a notable improvement was achieved through the extension of the Region-Adaptive Hierarchical Transform (RAHT) to inter-frame coding. This extension, referred to hereby as inter-RAHT anchor, leverages the motion vectors obtained during the geometry motion estimation phase.

For accurate prediction, the current frame is fully partitioned into blocks that will be predicted sequentially. The block that is currently being processed is called current block. For a given current block, its best matching block in the reference point cloud frame is searched starting from a zero motion point. The cost of each candidate block is the sum of its contained points' cost with respect to the points in the target block, which is defined by absolute geometry distance. The candidate block with the minimum cost is considered to be the best matching block. The displacement between the best matching block and searched target block is the optimal local motion and is exhaustively searched on a predefined search pattern. Once found, the optimal local motion is summed up with all previous optimal motion to be the overall motion. The overall motion is used as a starting point for the next local motion search until the search reaches the local minimum or the maximum search range defined by the search window. The cost of the best matching block is called the merge cost of the current block. Then, the current block is further split into smaller blocks by one-level octree partition. The sub-blocks will go through the same above-mentioned process. The sum of all sub-blocks' merge cost is called the split cost of the current block. The merge cost and split cost are compared to decide the split/merge mode of the current block.

The motion vectors, initially employed to track the change in geometry across frames, are reused to facilitate inter-frame coding of the attributes.

There is no guarantee that these motion vectors, which primarily describe the movement of geometry, are inherently optimal for attribute coding as well.

To address the limitations, a new attribute inter-prediction framework using motion search criterion, proper reference, attribute projection and in-loop filter is described herein.

In the Method 1, the motion estimation adopts an alternative motion estimation strategy that incorporates color distance into the motion search criterion wherein geometry and attribute motion are jointly searched which leads to a single motion vector associated with each predicted block. The composed distance is the weighted sum of color and geometry distance. Parameter alpha is used to control the weight given to the color and geometry distances for the calculation of the composed distance. With the composed distance, two new types of search criterion are used to estimate the motion vectors: one is using the nearest neighbor composed distance, the other is the minimum composed distance based on the search of composed distances associated with each reference point within the search window.

Method 2 also uses single-pass joint motion estimation, as in Method 1, but further projects attributes from the motion compensated frame onto the reconstructed geometry of the current frame. Nearest neighbor and GPCC attribute projection methods are able to be used, but any other recoloring scheme can be applied such as wiener-based filtering scheme, as well. Then, the inputs to the attribute coder are given.

Method 3 is a new dedicated attribute coding scheme using a two-pass motion search scheme, where the first pass is based on geometry only, as in the anchor, and the second one dedicatedly targets on eliminating temporal attribute redundancy. In the new framework, motion search is applied to current recolored geometry reconstructed frames instead of current uncompressed frames. The motion search strategy is the same as the one proposed in Method 1 with different alpha value.

Method 4 is built upon Method 3 but further projects the motion compensated frame onto the current geometry reconstructed frame.

Method 5 applies an in-loop filter to the projected attributes. The in-loop filter can be any filter, such as, a low-pass filter or wiener filter.

FIG. 1 illustrates a diagram of a motion estimation implementation according to some embodiments. A current frame 100 and a past frame 102 are utilized to perform geometry-based motion estimation 104. Then, the geometry motion vectors are extracted 106. Based on the geometry motion vectors 106 and the previous frame 102, geometry motion compensation with attributes is performed 108 which generates a motion compensated frame 110. The motion compensated frame 110 is able to include the geometry information, $G'_{t-1}$, and the color information, $G'_{t-1}$. Inter-frame geometry coding 112 is performed using the motion compensated frame 110 and the current frame 100 which generates a reconstructed geometry 114.

Using the current frame 100 and the reconstructed geometry 114, G-PCC color projection is implemented 116 to project the attributes of the current frame 100 onto the reconstructed geometry 114 to generate a new point cloud 118. Based on the motion compensated frame 110 and the new point cloud 118, inter-frame attribute coding 120 is performed to generate a reconstructed geometry and color frame 122. In particular, the compensated color (based on the previous frame 102) with the projected color (based on the current frame 100) are used to do the inter-frame attribute coding 120. The reconstructed geometry and color frame 122 is then able to be used as a reference frame for the next frame.

Figure 2:
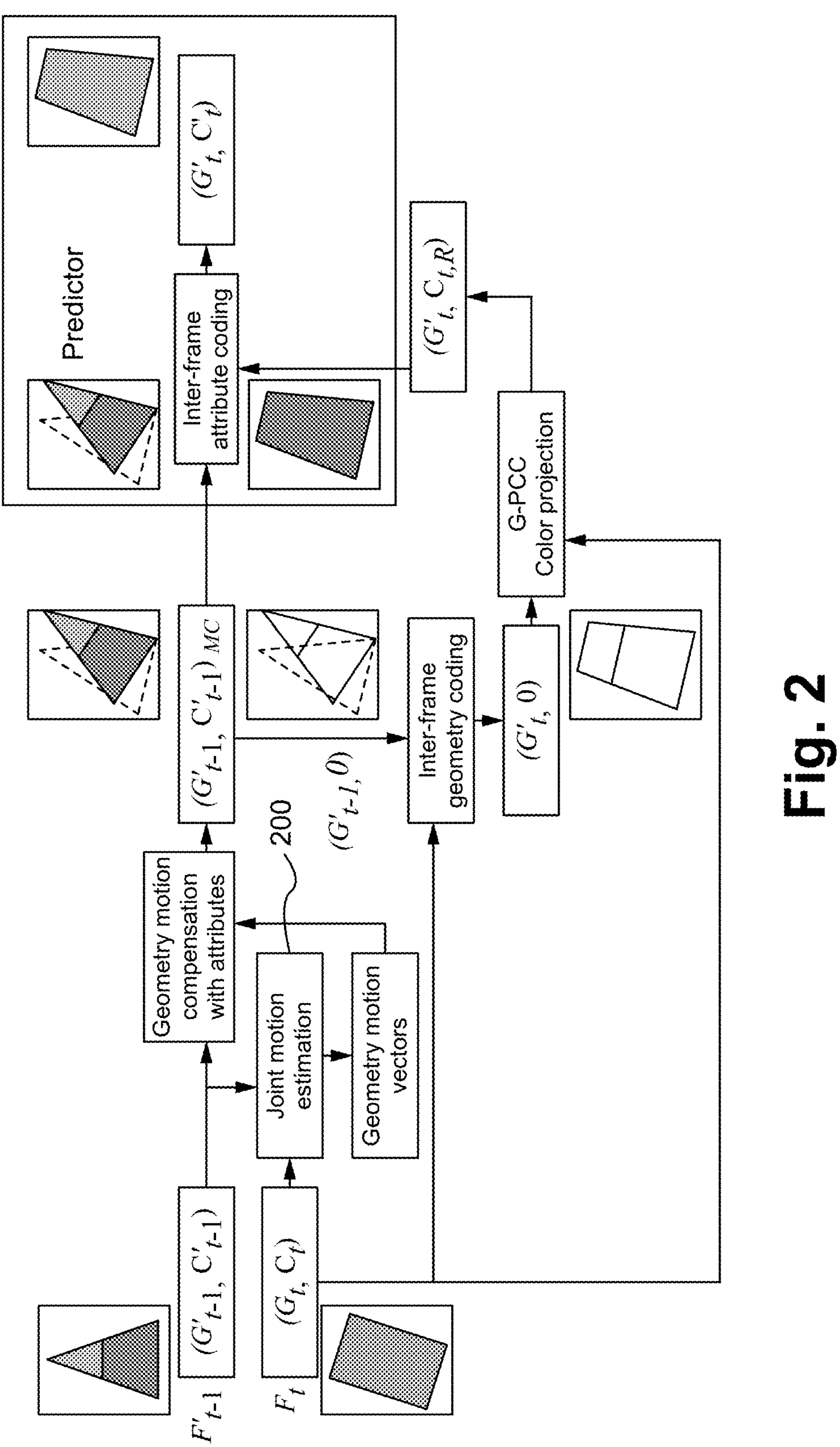
FIG. 2 illustrates a diagram of a single pass, joint geometry and attribute motion estimation implementation according to some embodiments.

FIG. 2 illustrates a diagram of a single pass, joint geometry and attribute motion estimation implementation according to some embodiments. The implementation is similar to the previous implementation; however, instead of implementing geometry-based motion estimation 104 (FIG. 1), joint motion estimation 200 is implemented. Joint motion estimation 200 means that the motion estimation is not only based on the geometry information, but rather based on geometry information and attribute information (e.g., color distortion). By using joint motion estimation 200, future steps have slightly different information when compared with the motion estimation implementation of FIG. 1. Specifically, since the color distortion information is included in the motion estimation, a different motion compensated frame may be generated which keeps the performance of the geometry coding and also gives new displacement which may improve the inter-frame attribute coding.

Figure 3:
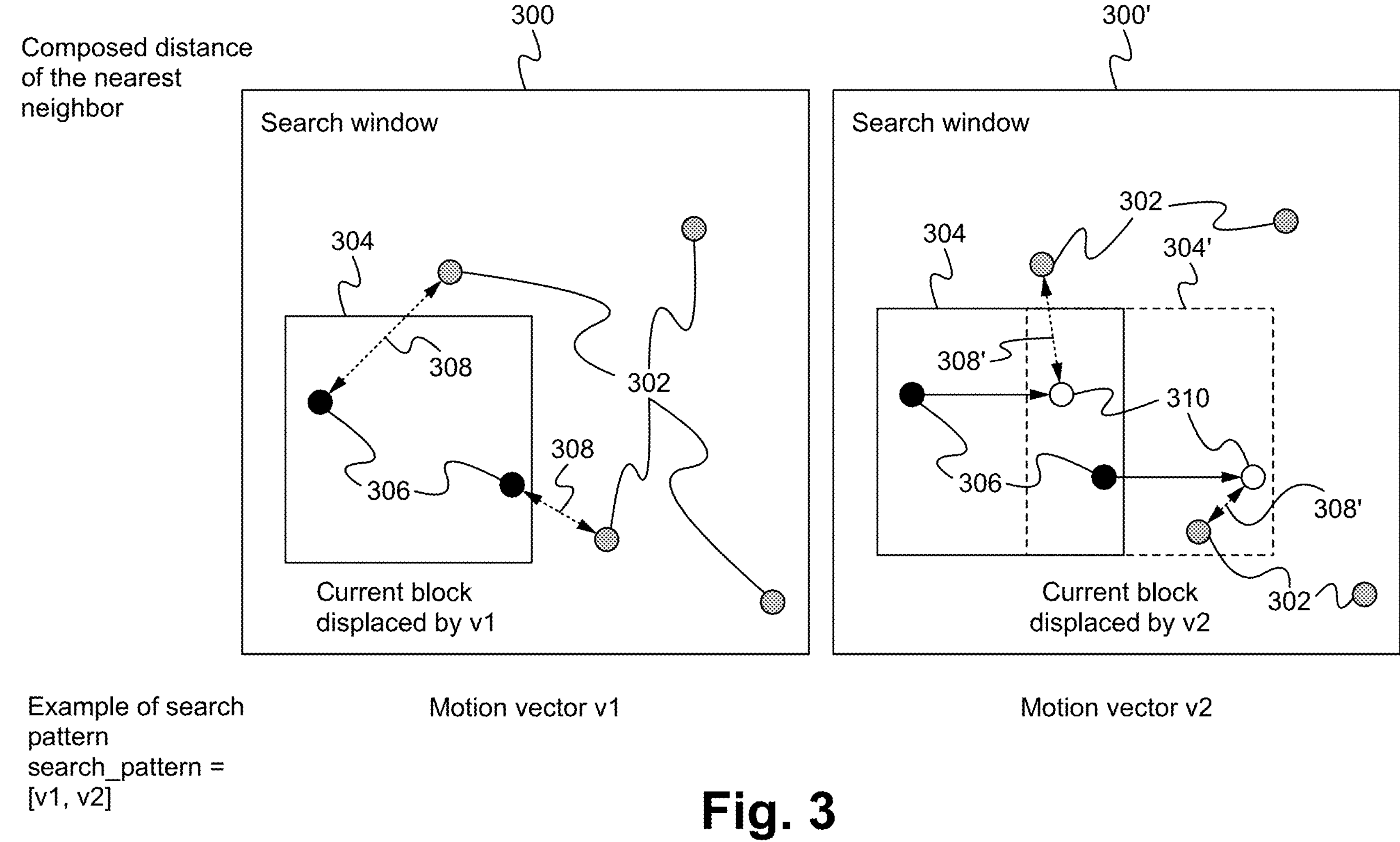
FIG. 3 illustrates a diagram of joint motion estimation according to some embodiments.

FIG. 3 illustrates a diagram of joint motion estimation according to some embodiments. The motion estimation is based on the displacement of a current block in relation to a search window. A first search window 300 includes the points 302 from a past frame (e.g., reference block), and a current block 304 includes points 306 in the current block 304 (e.g., current frame). A closest neighbor for each point 306 in the current block 304 is found in the first search window 300. Distances 308 (in the geometry domain and in the color domain) are calculated from each point 306 in the current block 304 to the closest neighboring point 302 from the past frame in the first search window 300. Although a square search window and a square current block are shown, the search areas/blocks are able to be a cube or another 3D shape. The current block 304 is able to be moved (e.g., in any direction) based on a search pattern (e.g., move the current block 304 to the right by 5 units). In the first search window 300, the current block 304 is displaced by v1. In some embodiments, the amount of displacement of the current block 304 is predefined, and the directions of displacement are predefined. For example, a specific set of displacements are utilized for efficiency purposes.

In the second search window 300', the current block 304' is displaced by v2. The points 306 also move the same distance and direction as the current block 304' resulting in displaced points 310 (e.g., the points in the current block displaced by the motion vector, v2). Then, the distance 308' (in the geometry domain and in the color domain) of the closest neighboring point 302 to each of the displaced points 310 is found. The displacement that results in the smallest total distortion ($\delta$) is determined and selected. The total distortion is based on the geometry ($\delta_g$) and the color ($\delta_c$). The calculation for total distortion is:

$$\delta = (1-\alpha) * \delta_g + \alpha * \delta_c, \text{ where } \alpha = 0.2, \text{ and where:}$$

$$\delta_g = |x_{pred} - x_{ref}| + |y_{pred} - y_{ref}| + |z_{pred} - z_{ref}|$$

$$\delta_c = |Y_{pred} - Y_{ref}| + |U_{pred} - U_{ref}| + |V_{pred} - V_{ref}|$$

For example, there may be many different displacements in a search pattern. After each displacement is found, they are compared, and the displacement which results in the smallest total distortion is selected.

Figure 4:
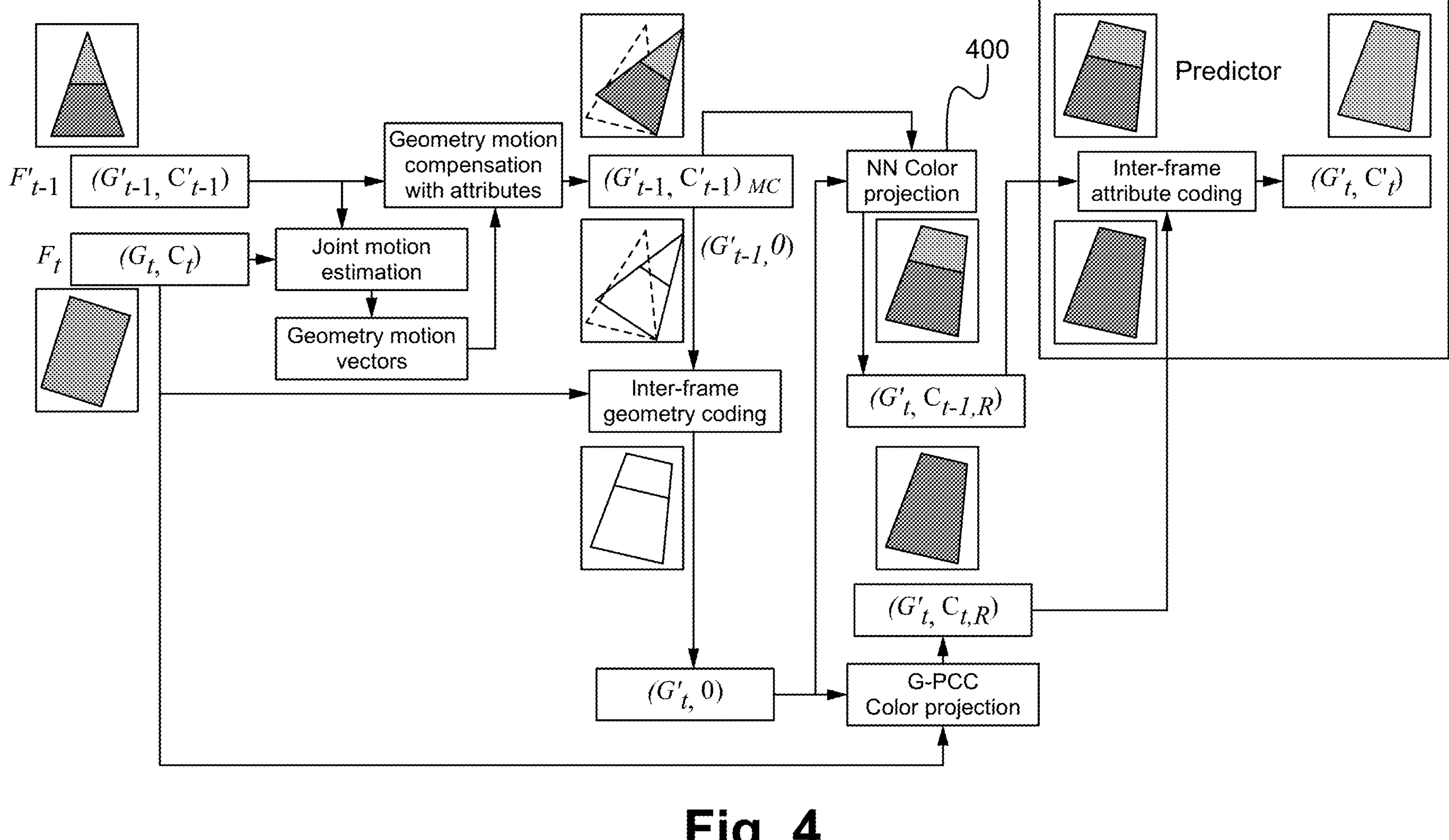
FIG. 4 illustrates a diagram of a single pass, joint geometry and attribute, color projection motion estimation implementation according to some embodiments.

FIG. 4 illustrates a diagram of a single pass, joint geometry and attribute, color projection motion estimation implementation according to some embodiments. The motion estimation implementation is similar to the implementation of FIG. 2 with some differences.

The past frame and the current frame are still used for joint motion estimation. Motion compensation still uses the geometry and color information. Inter-frame geometry coding is implemented the same to reconstruct the geometry. Color projection 400 takes the color information from the motion compensated frame to colorize the reconstructed geometry. Unlike the implementation described in FIG. 2 where the geometry of the predictor and the G-PCC color projection do not match, in the color projection implementation (FIG. 4), the geometry does match. The color from the color projection 400 (which comes from the motion compensated geometry with attributes) is projected onto the reconstructed geometry. The inter-frame attribute coding is then able to be performed using the two geometries that match to generate a new reference frame for the next iteration.

Figure 5:
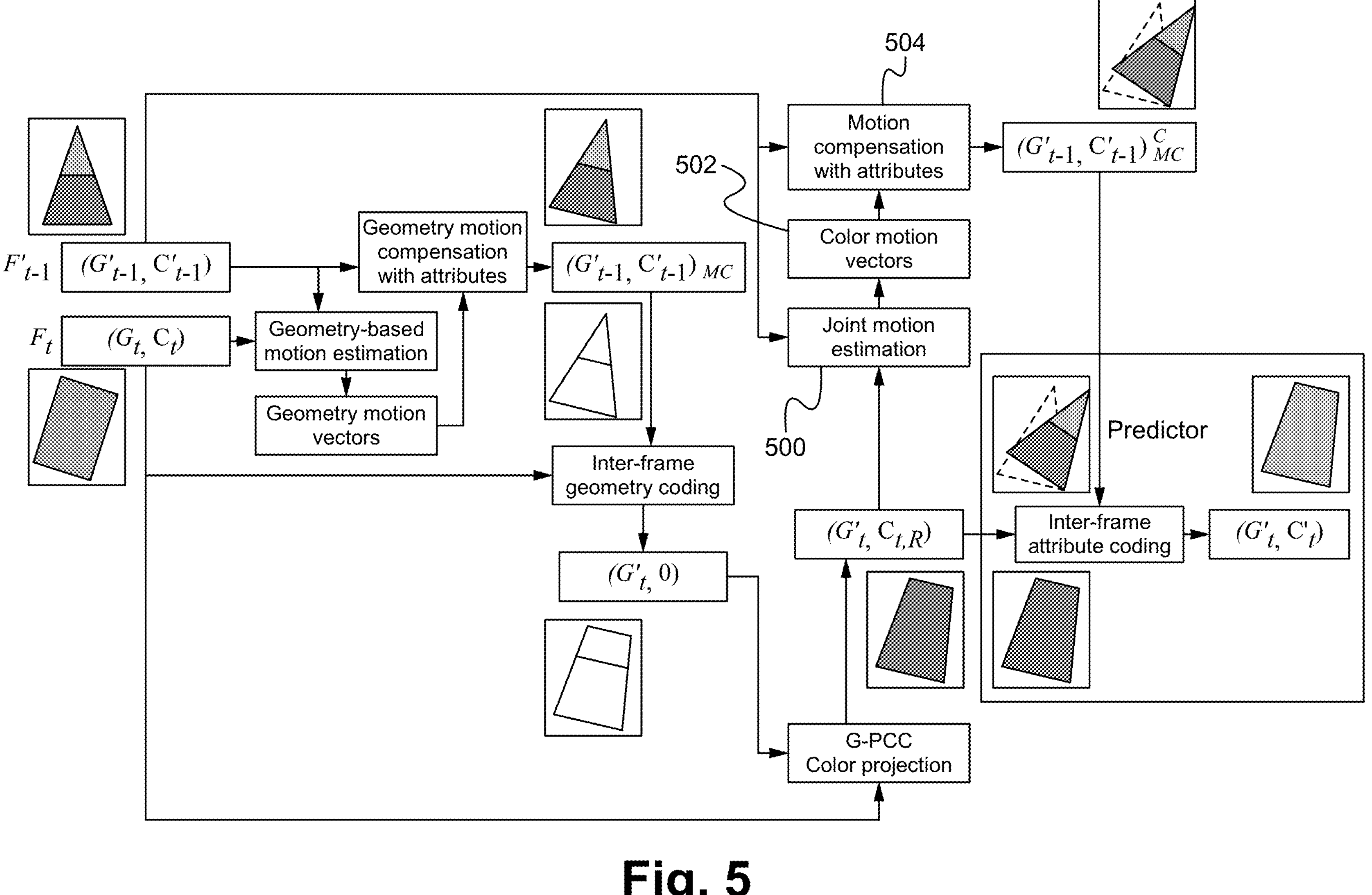
FIG. 5 illustrates a diagram of a two pass, joint geometry and geometry-attribute motion estimation implementation according to some embodiments.

FIG. 5 illustrates a diagram of a two pass, joint geometry and geometry-attribute motion estimation implementation according to some embodiments. In the two pass implementation, motion estimation is performed twice, once for geometry only and once for inter-frame attribute coding.

The past frame and the current frame are used for geometry-based motion estimation. The geometry motion vectors are used for geometry motion compensation with attributes. Inter-frame geometry coding is implemented as well.

Joint motion estimation 500 is implemented and receives as input the reconstructed geometry with color projection. The reconstructed geometry of the current frame and the projected color onto the current frame are received to perform joint motion estimation 500. The past frame is also used in performing the joint motion estimation 500. The joint motion estimation 500 uses geometry information and attribute information. Color motion vectors 502 are extracted. Then, motion compensation with attributes 504 is performed based on the new set of motion vectors which results in a motion compensated frame. Inter-frame attribute coding is applied performed using the predictor from the motion compensation 504 and the reconstructed geometry for the current frame.

Figure 6:
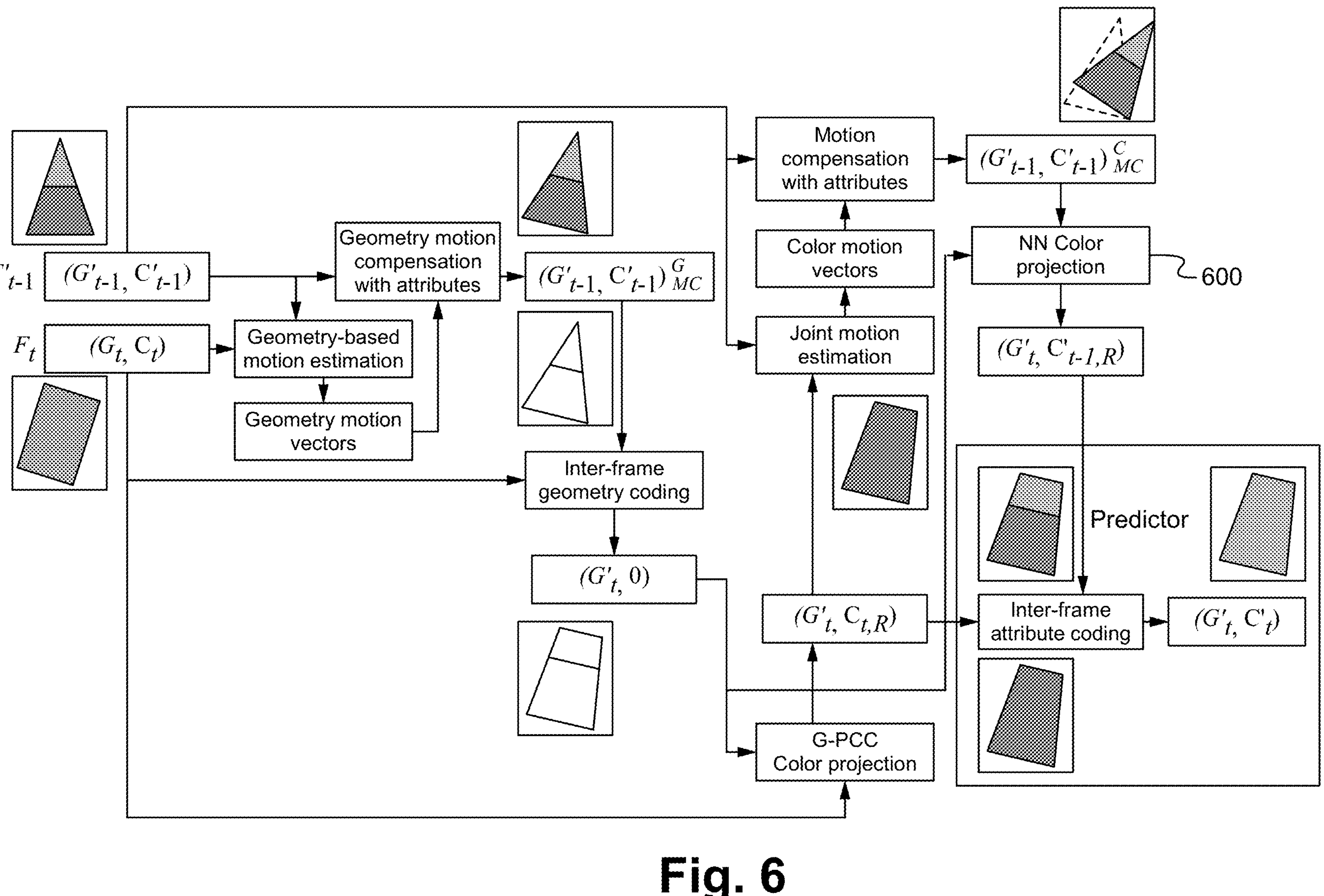
FIG. 6 illustrates a diagram of a two pass, joint geometry and geometry-attribute with color projection motion estimation implementation according to some embodiments.

FIG. 6 illustrates a diagram of a two pass, joint geometry and geometry-attribute with color projection motion estimation implementation according to some embodiments. The color projection implementation (FIG. 6) is similar to the implementation described in FIG. 5, but the color projection implementation also includes color projection 600. For example, geometry coding is the same, and joint motion estimation is also the same to extract the motion vectors for attribute coding.

Color projection 600 is added where the color obtained from the motion compensation with attributes is projected to the reconstructed geometry which results in the geometries being aligned. The predictor and the current frame geometries are the same shape. Then, inter-frame attribute coding is performed to generate a new reference frame for the next iteration.

Figure 7:
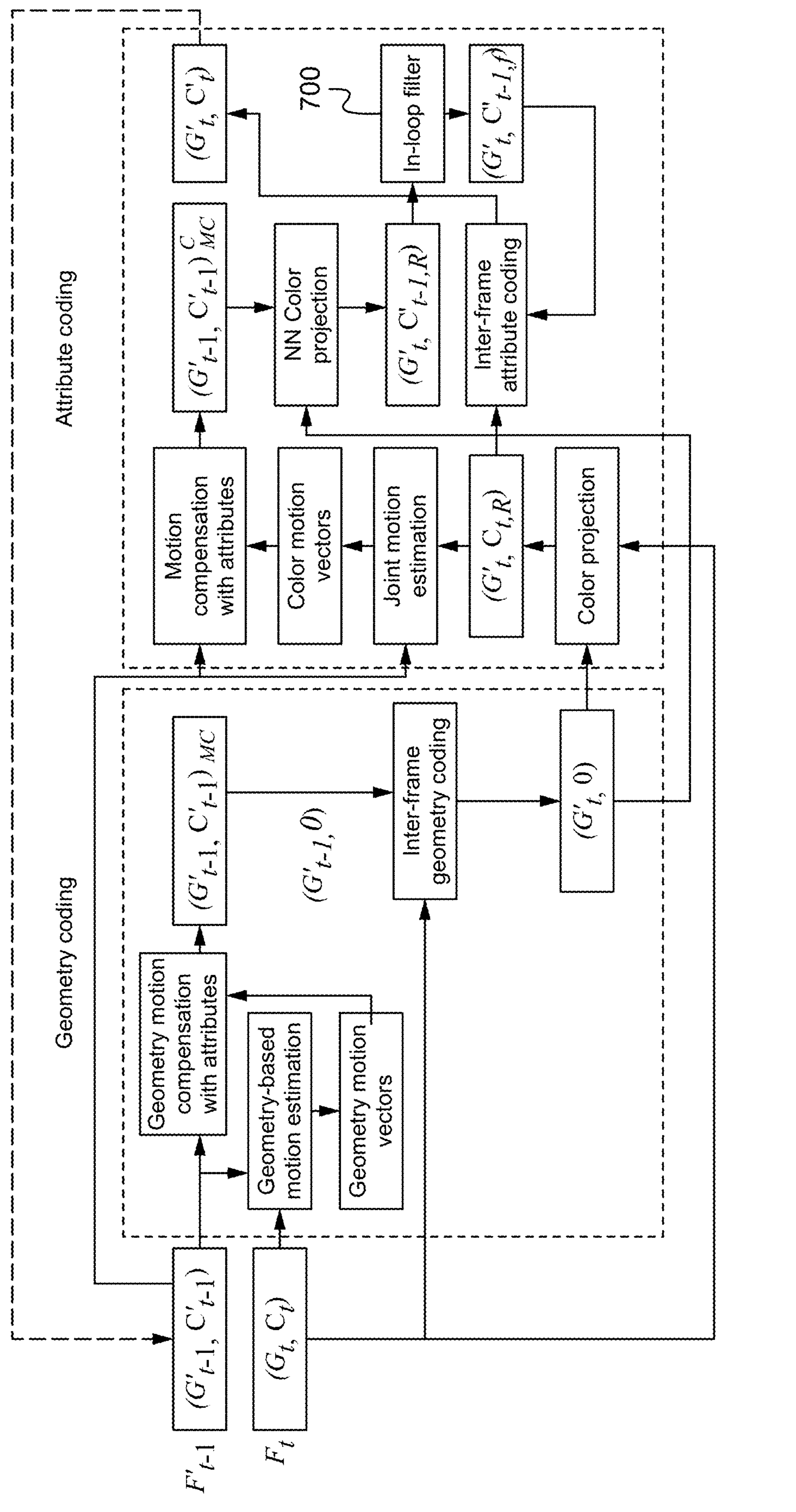
FIG. 7 illustrates a diagram of a two pass, joint geometry and geometry-attribute with color projection and in-loop filter motion estimation implementation according to some embodiments.

FIG. 7 illustrates a diagram of a two pass, joint geometry and geometry-attribute with color projection and in-loop filter motion estimation implementation according to some embodiments. The geometry coding is the same as in previous implementations.

In the attribute coding, an in-loop filter 700 is included. Joint motion estimation is still included as previously discussed. Additionally, the color projection is also included. The projected frame after the color projection is filtered using the in-loop filter 700. After the filtering, then inter-frame attribute coding is performed to generate a new reference frame for the next iteration.

When comparing the different implementations, the first implementation utilizes joint motion estimation and is single pass; the second implementation added color projection; the third implementation involves a two pass method without color projection; the fourth implementation is a two pass method with color projection; and the fifth implementation is a two pass method with color projection and in-loop filtering.

Figure 8:
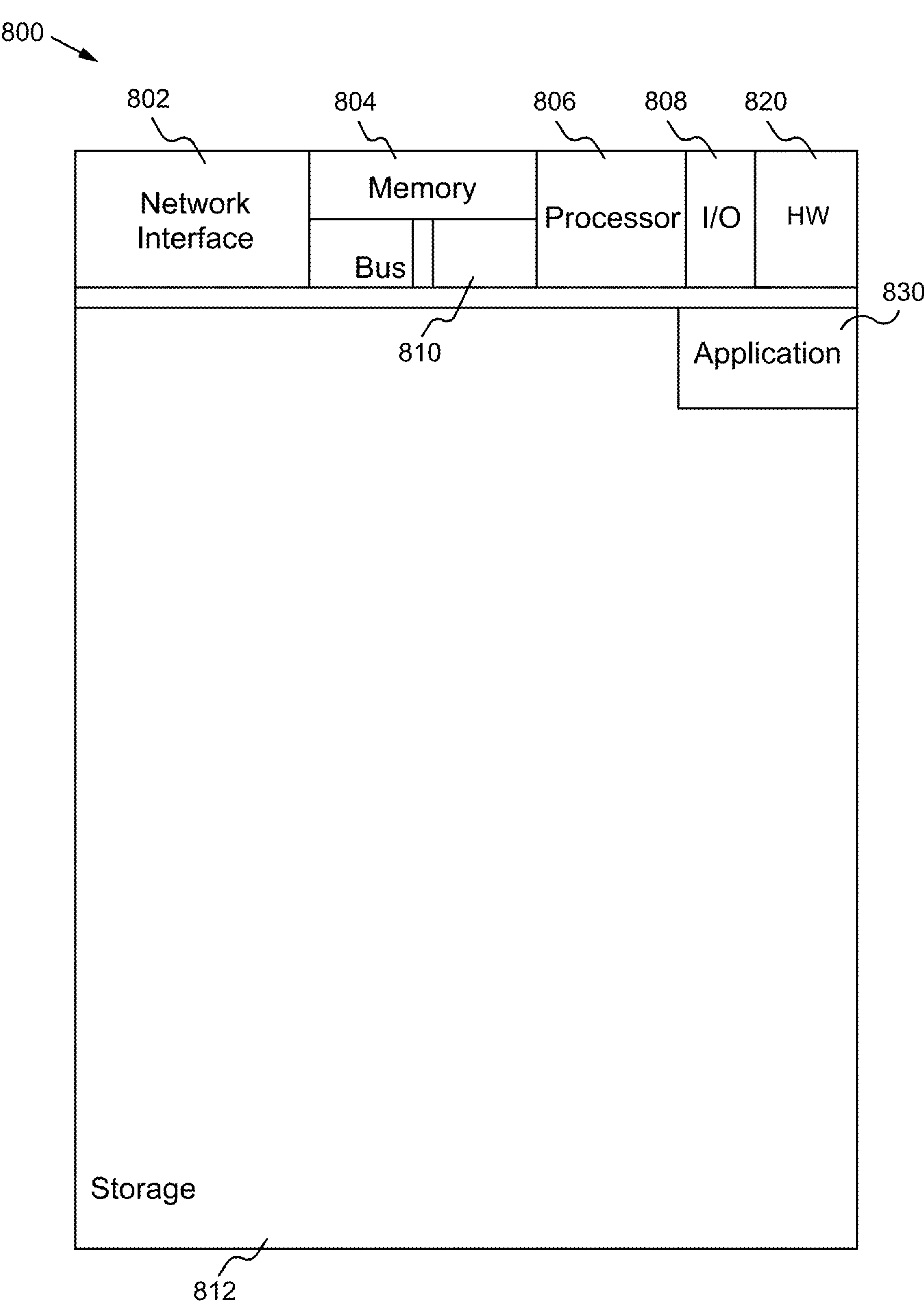
FIG. 8 illustrates a block diagram of an exemplary computing device configured to implement the motion estimation method according to some embodiments.

FIG. 8 illustrates a block diagram of an exemplary computing device configured to implement the motion estimation method according to some embodiments. The computing device 800 is able to be used to acquire, store, compute, process, communicate and/or display information such as images and videos including 3D content. The computing device 800 is able to implement any of the encoding/decoding aspects. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Motion estimation application(s) 830 used to implement the motion estimation implementation are likely to be stored in the storage device 812 and memory 804 and processed as applications are typically processed. More or fewer components shown in FIG. 8 are able to be included in the computing device 800. In some embodiments, motion estimation hardware 820 is included. Although the computing device 800 in FIG. 8 includes applications 830 and hardware 820 for the motion estimation implementation, the motion estimation method is able to be implemented on a computing device in hardware, firmware, software or any combination thereof. For example, in some embodiments, the motion estimation applications 830 are programmed in a memory and executed using a processor. In another example, in some embodiments, the motion estimation hardware 820 is programmed hardware logic including gates specifically designed to implement the motion estimation method.

In some embodiments, the motion estimation application(s) 830 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the motion estimation method, a device acquires or receives 3D content (e.g., point cloud content). The motion estimation method is able to be implemented with user assistance or automatically without user involvement.

In operation, the motion estimation methods result in various improvements in terms of accuracy or efficiency. Depending on the implementation, the process may be more complex, take more time, or produce more accurate or better results (e.g., attribute coding and/or geometry coding).

Some Embodiments of Inter-Frame Attribute Coding in Geometry-Based Dynamic Point Cloud Compression 1. A method programmed in a non-transitory memory of a device comprising:
   performing joint motion estimation based on a previous frame and a current frame of content to generate geometry motion vectors; and
   generating a new frame based on the geometry motion vectors using inter-frame attribute coding.
2. The method of clause 1 further comprising:
   performing geometry motion compensation with attribute information based on the geometry motion vectors to generate a motion compensated frame;
   performing inter-frame geometry coding to generate a reconstructed geometry; and
   implementing color projection to project the attributes of the current frame onto the reconstructed geometry.
3. The method of clause 2 further comprising implementing additional color projection.
4. The method of clause 1 wherein the joint motion estimation is based on geometry information and attribute information.
5. The method of clause 4 wherein the geometry information comprises a geometry distance, the attribute information comprises a color distance, and the geometry distance and color distance are combined to generate a composed distance which is used for the joint motion estimation.
6. A method programmed in a non-transitory memory of a device comprising:
   performing geometry-based motion estimation based on a previous frame and a current frame of content to generate geometry motion vectors;
   performing joint motion estimation based on the previous frame and a generated point cloud based on inter-frame geometry coding and color projection to generate color motion vectors;
   performing motion compensation with attributes to generate a motion compensated frame; and
   generating a new frame based on the motion compensated frame using inter-frame attribute coding.
7. The method of clause 6 further comprising implementing additional color projection.
8. The method of clause 6 wherein the joint motion estimation is based on geometry information and attribute information.
9. The method of clause 8 wherein the geometry information comprises a geometry distance, the attribute information comprises a color distance, and the geometry distance and color distance are combined to generate a composed distance which is used for the joint motion estimation.
10. The method of clause 6 further comprising implementing an in-loop filter to filter color in a projected frame.
11. An apparatus comprising:
    a non-transitory memory for storing an application, the application for:
      performing joint motion estimation based on a previous frame and a current frame of content to generate geometry motion vectors; and
      generating a new frame based on the geometry motion vectors using inter-frame attribute coding; and
    a processor coupled to the memory, the processor configured for processing the application.
12. The apparatus of clause 11 wherein the application is further configure for:
    performing geometry motion compensation with attribute information based on the geometry motion vectors to generate a motion compensated frame;
    performing inter-frame geometry coding to generate a reconstructed geometry; and
    implementing color projection to project the attributes of the current frame onto the reconstructed geometry.
13. The apparatus of clause 12 wherein the application is further configure for implementing additional color projection.
14. The apparatus of clause 11 wherein the joint motion estimation is based on geometry information and attribute information.
15. The apparatus of clause 14 wherein the geometry information comprises a geometry distance, the attribute information comprises a color distance, and the geometry distance and color distance are combined to generate a composed distance which is used for the joint motion estimation.
16. An apparatus comprising:
    a non-transitory memory for storing an application, the application for:
      performing geometry-based motion estimation based on a previous frame and a current frame of content to generate geometry motion vectors;
      performing joint motion estimation based on the previous frame and a generated point cloud based on inter-frame geometry coding and color projection to generate color motion vectors;
      performing motion compensation with attributes to generate a motion compensated frame; and
      generating a new frame based on the motion compensated frame using inter-frame attribute coding; and
    a processor coupled to the memory, the processor configured for processing the application.
17. The apparatus of clause 16 wherein the application is further configure for implementing additional color projection.
18. The apparatus of clause 16 wherein the joint motion estimation is based on geometry information and attribute information.
19. The apparatus of clause 18 wherein the geometry information comprises a geometry distance, the attribute information comprises a color distance, and the geometry distance and color distance are combined to generate a composed distance which is used for the joint motion estimation.

20. The apparatus of clause 16 wherein the application is further configure for implementing an in-loop filter to filter color in a projected frame.

21. A system comprising:
an encoder configured for encoding content; and
a decoder configured for:
performing joint motion estimation based on a previous frame and a current frame of content to generate geometry motion vectors; and
generating a new frame based on the geometry motion vectors using inter-frame attribute coding.

22. The system of clause 21 wherein the decoder is further configure for:
performing geometry motion compensation with attribute information based on the geometry motion vectors to generate a motion compensated frame;
performing inter-frame geometry coding to generate a reconstructed geometry; and
implementing color projection to project the attributes of the current frame onto the reconstructed geometry.

23. The system of clause 22 wherein the decoder is further configure for implementing additional color projection.

24. The system of clause 21 wherein the joint motion estimation is based on geometry information and attribute information.

25. The system of clause 24 wherein the geometry information comprises a geometry distance, the attribute information comprises a color distance, and the geometry distance and color distance are combined to generate a composed distance which is used for the joint motion estimation.

26. A system comprising:
an encoder configured for encoding content; and
a decoder configured for:
performing geometry-based motion estimation based on a previous frame and a current frame of content to generate geometry motion vectors;
performing joint motion estimation based on the previous frame and a generated point cloud based on inter-frame geometry coding and color projection to generate color motion vectors;
performing motion compensation with attributes to generate a motion compensated frame; and
generating a new frame based on the motion compensated frame using inter-frame attribute coding.

27. The system of clause 26 wherein the decoder is further configure for implementing additional color projection.

28. The system of clause 26 wherein the joint motion estimation is based on geometry information and attribute information.

29. The system of clause 28 wherein the geometry information comprises a geometry distance, the attribute information comprises a color distance, and the geometry distance and color distance are combined to generate a composed distance which is used for the joint motion estimation.

30. The system of clause 26 wherein the decoder is further configure for implementing an in-loop filter to filter color in a projected frame.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed as instructions in a non-transitory memory,
the instructions processed by a processor of a device, the method comprising:
performing joint motion estimation based on a previous frame and a current frame of content to generate geometry motion vectors, wherein the joint motion estimation is based on geometry information and attribute information, wherein the geometry information comprises a geometry distance, the attribute information comprises a color distance, and the geometry distance and color distance are combined to generate a composed distance which is used for the joint motion estimation; and
generating a new frame based on the geometry motion vectors using inter-frame attribute coding.

2. The method of claim 1 further comprising:
performing geometry motion compensation with attribute information based on the geometry motion vectors to generate a motion compensated frame;
performing inter-frame geometry coding to generate a reconstructed geometry; and
implementing color projection to project the attributes of the current frame onto the reconstructed geometry.

3. The method of claim 2 further comprising implementing additional color projection.

4. A method programmed as instructions in a non-transitory memory,
the instructions processed by a processor of a device, the method comprising:
performing geometry-based motion estimation based on a previous frame and a current frame of content to generate geometry motion vectors;
performing joint motion estimation based on the previous frame and a generated point cloud based on inter-frame geometry coding and color projection to generate color motion vectors, wherein the joint motion estimation is based on geometry information and attribute information, wherein the geometry information comprises a geometry distance, the attribute information comprises a color distance, and the geometry distance and color distance are combined to generate a composed distance which is used for the joint motion estimation;
performing motion compensation with attributes to generate a motion compensated frame; and
generating a new frame based on the motion compensated frame using inter-frame attribute coding.

5. The method of claim 4 further comprising implementing additional color projection.

6. The method of claim 4 further comprising implementing an in-loop filter to filter color in a projected frame.

7. An apparatus comprising:
a non-transitory memory for storing an application, the application containing instructions for:
performing joint motion estimation based on a previous frame and a current frame of content to generate geometry motion vectors, wherein the joint motion estimation is based on geometry information and attribute information, wherein the geometry information comprises a geometry distance, the attribute information comprises a color distance, and the geometry distance and color distance are combined to generate a composed distance which is used for the joint motion estimation; and generating a new frame based on the geometry motion vectors using inter-frame attribute coding; and a processor coupled to the memory, the processor configured for processing the application.

8. The apparatus of claim 7 wherein the application is further configure for:

performing geometry motion compensation with attribute information based on the geometry motion vectors to generate a motion compensated frame;

performing inter-frame geometry coding to generate a reconstructed geometry; and implementing color projection to project the attributes of the current frame onto the reconstructed geometry.

9. The apparatus of claim 8 wherein the application is further configure for implementing additional color projection.

10. An apparatus comprising:

a non-transitory memory for storing an application, the application containing instructions for:

performing geometry-based motion estimation based on a previous frame and a current frame of content to generate geometry motion vectors;

performing joint motion estimation based on the previous frame and a generated point cloud based on inter-frame geometry coding and color projection to generate color motion vectors, wherein the joint motion estimation is based on geometry information and attribute information, wherein the geometry information comprises a geometry distance, the attribute information comprises a color distance, and the geometry distance and color distance are combined to generate a composed distance which is used for the joint motion estimation;

performing motion compensation with attributes to generate a motion compensated frame; and generating a new frame based on the motion compensated frame using inter-frame attribute coding; and a processor coupled to the memory, the processor configured for processing the application.

11. The apparatus of claim 10 wherein the application is further configure for implementing additional color projection.

12. The apparatus of claim 10 wherein the application is further configure for implementing an in-loop filter to filter color in a projected frame.

13. A system comprising:

an encoder configured for encoding content; and a decoder configured for:

performing joint motion estimation based on a previous frame and a current frame of content to generate geometry motion vectors, wherein the joint motion estimation is based on geometry information and attribute information, wherein the geometry information comprises a geometry distance, the attribute information comprises a color distance, and the geometry distance and color distance are combined to generate a composed distance which is used for the joint motion estimation; and generating a new frame based on the geometry motion vectors using inter-frame attribute coding.

14. The system of claim 13 wherein the decoder is further configure for:

performing geometry motion compensation with attribute information based on the geometry motion vectors to generate a motion compensated frame;

performing inter-frame geometry coding to generate a reconstructed geometry; and implementing color projection to project the attributes of the current frame onto the reconstructed geometry.

15. The system of claim 14 wherein the decoder is further configure for implementing additional color projection.

16. A system comprising:

an encoder configured for encoding content; and a decoder configured for:

performing geometry-based motion estimation based on a previous frame and a current frame of content to generate geometry motion vectors;

performing joint motion estimation based on the previous frame and a generated point cloud based on inter-frame geometry coding and color projection to generate color motion vectors;

performing motion compensation with attributes to generate a motion compensated frame, wherein the joint motion estimation is based on geometry information and attribute information, wherein the geometry information comprises a geometry distance, the attribute information comprises a color distance, and the geometry distance and color distance are combined to generate a composed distance which is used for the joint motion estimation; and generating a new frame based on the motion compensated frame using inter-frame attribute coding.

17. The system of claim 16 wherein the decoder is further configure for implementing additional color projection.

18. The system of claim 16 wherein the decoder is further configure for implementing an in-loop filter to filter color in a projected frame.

* * * * *